United States Patent [19]

Winter et al.

[11] Patent Number: 5,089,074

[45] Date of Patent: Feb. 18, 1992

[54] FLEXIBLE HOSE CONSTRUCTION AND METHOD OF MAKING THE SAME

[75] Inventors: Jeffrey J. Winter, Ocala, Fla.; Homer N. Holden, Sylva, N.C.; James L. Lawrence, Ocala, Fla.

[73] Assignee: Dayco Products, Inc., Dayton, Ohio

[21] Appl. No.: 405,487

[22] Filed: Sep. 11, 1989

[51] Int. Cl.⁵ .................. B29C 47/06; B29C 47/20
[52] U.S. Cl. .................. 156/244.13; 138/121; 138/125; 156/149; 156/187; 156/244.22; 156/292; 156/294
[58] Field of Search ............ 156/143, 144, 149, 187, 156/188, 190, 195, 290, 292, 294, 244.13, 244.22; 138/121, 122, 125, 141, 173; 174/29, 47

[56] References Cited

U.S. PATENT DOCUMENTS

| | | | |
|---|---|---|---|
| 2,757,690 | 8/1956 | Young | 138/125 |
| 3,185,182 | 5/1965 | Waddell et al. | 156/195 |
| 4,233,097 | 11/1980 | Stahl | 138/122 |
| 4,415,389 | 11/1983 | Medford et al. | 156/91 |

FOREIGN PATENT DOCUMENTS

| | | | |
|---|---|---|---|
| 0010751 | 5/1980 | European Pat. Off. | 156/244.13 |
| 2127646 | 1/1973 | Fed. Rep. of Germany | 138/121 |
| 0640760 | 7/1950 | United Kingdom | 138/122 |
| 0744435 | 2/1956 | United Kingdom | 174/47 |
| 0769993 | 3/1957 | United Kingdom | 138/121 |
| 1160805 | 8/1969 | United Kingdom | 174/47 |
| 1506776 | 4/1978 | United Kingdom | 138/121 |

*Primary Examiner*—Michael W. Ball
*Assistant Examiner*—Steven D. Maki
*Attorney, Agent, or Firm*—Joseph V. Tassone

[57] ABSTRACT

A flexible hose construction and method of making the same are provided, the flexible hose construction comprising an inner corrugated hose made of polymeric material and having a plurality of outwardly convex projections with recesses therebetween and extending from one end thereof to the other end thereof, an outer sleeve of reinforcing material disposed in telescoping relation on the inner hose, and a tube of polymeric material disposed between the sleeve of reinforcing material and the inner hose and extending in a generally straight-line manner from projection to projection of the inner hose so as to tend to prevent the sleeve of reinforcing material from entering into the recesses of the inner hose an amount that would end to substantially reduce the flexibility characteristics of the inner hose.

3 Claims, 2 Drawing Sheets

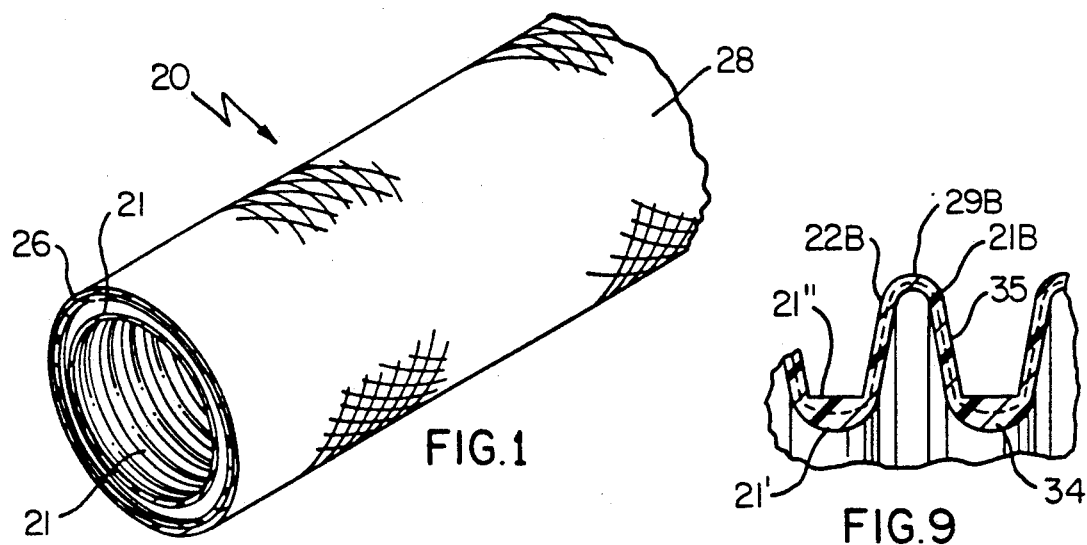
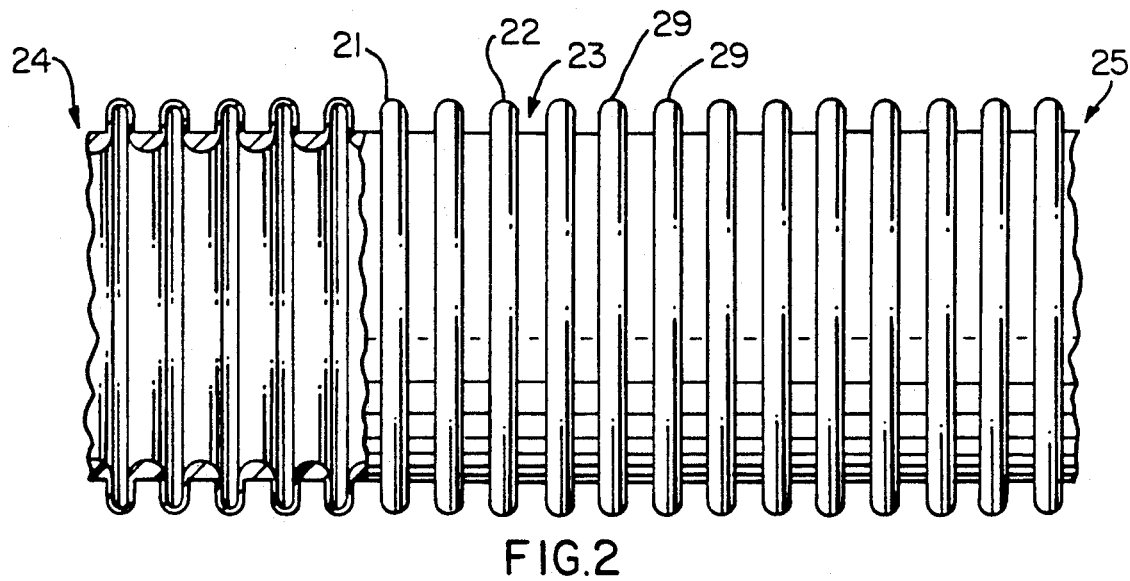
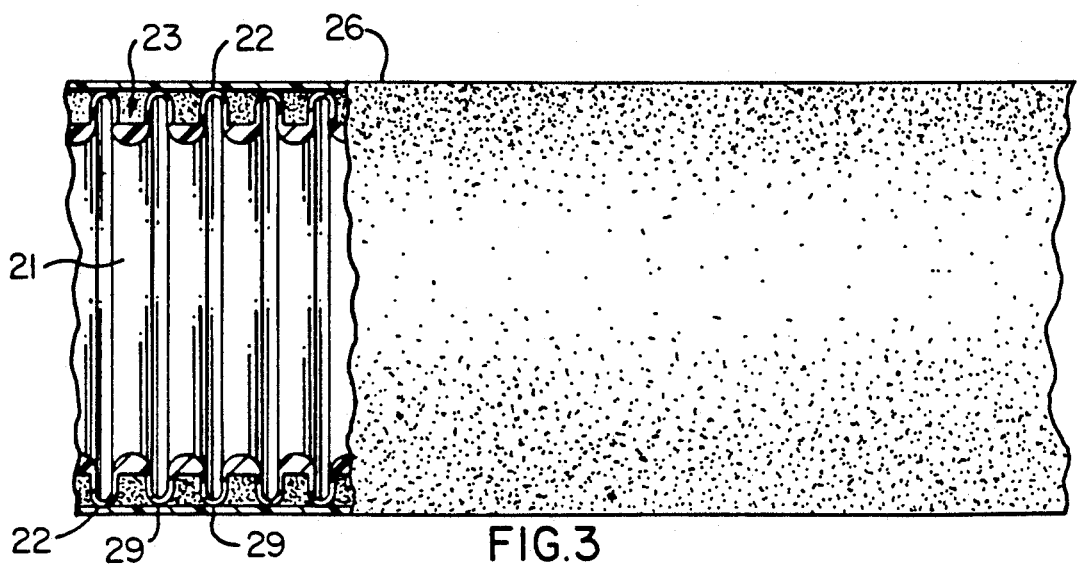

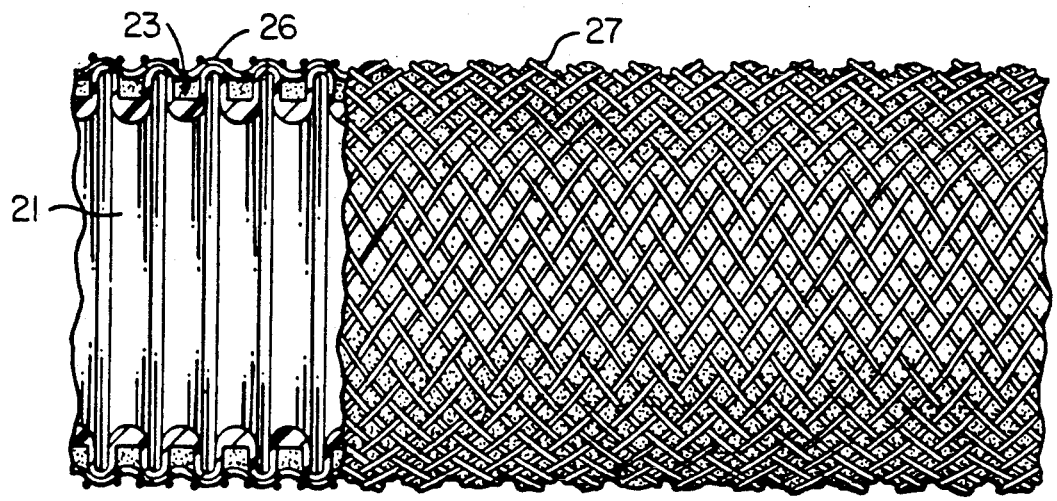
FIG.4
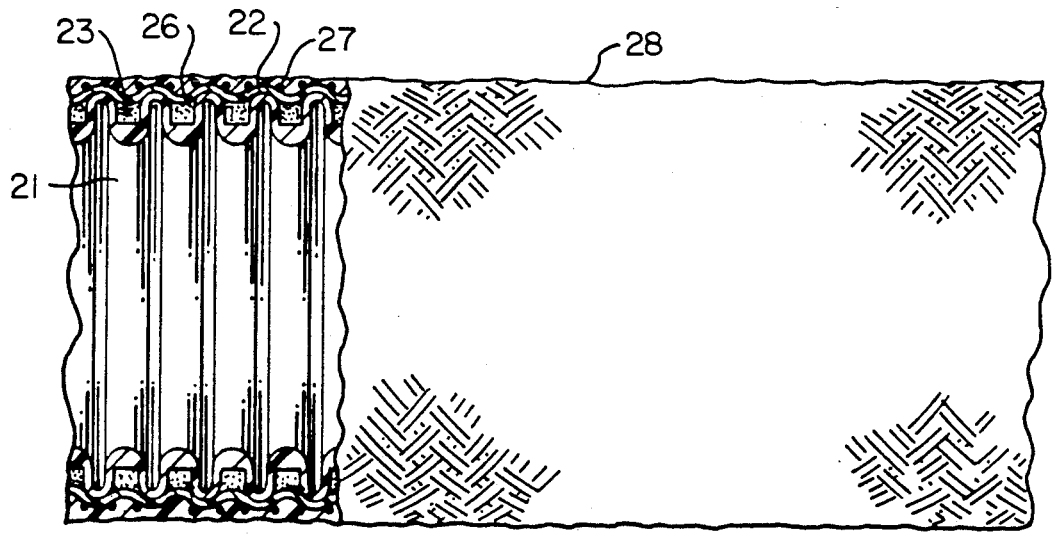
FIG.5
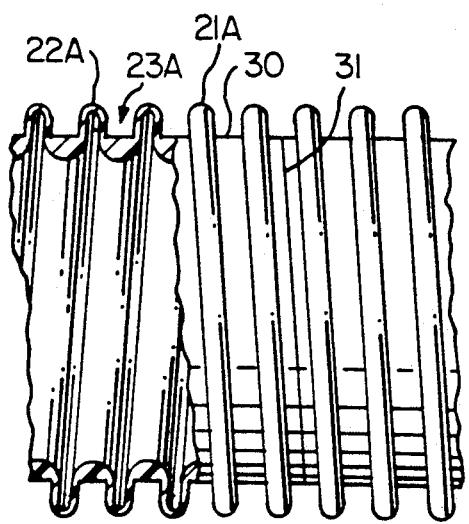
FIG.6
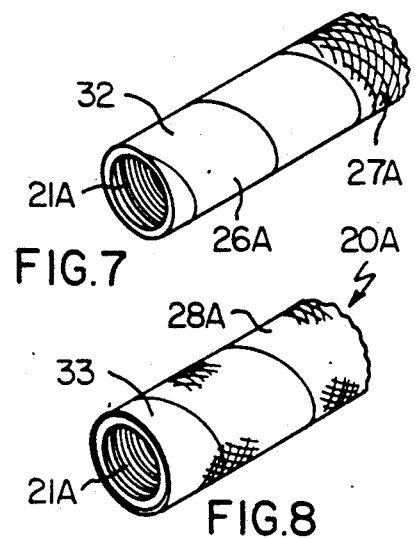
FIG.7
FIG.8

FLEXIBLE HOSE CONSTRUCTION AND METHOD OF MAKING THE SAME

BACKGROUND OF THE INVENTION

1. Field of the Invention

This invention relates to a new flexible hose construction and to a new method of making such a flexible hose construction.

2. Prior Art Statement

It is known to provide a flexible hose construction comprising an inner corrugated hose made of polymeric material and having a plurality of outwardly convex projections with recesses therebetween and extending from one end thereof to the other end thereof, and an outer sleeve of reinforcing material disposed in telescoping relation on the inner hose. For example, see the U.S. Pat. No. to Medford et al, 4,415,389.

SUMMARY OF THE INVENTION

It is one feature of this invention to provide a new flexible hose construction wherein the flexibility characteristics of an inner corrugated hose thereof are not substantially diminished by having an outer sleeve of reinforcing material extend into the recesses defined by the corrugations of the inner hose an amount that would diminish such flexibility characteristics.

In particular, it was found according to the teachings of this invention that a tube of polymeric material can be disposed between the sleeve of reinforcing material and the inner hose and extend in a generally straight-line manner from projection to projection of the inner hose so as to tend to prevent the sleeve of reinforcing material from entering into the recesses of the inner hose an amount that would tend to substantially reduce the flexibility characteristics of the corrugated inner hose.

In this manner, it was found according to the teachings of this invention, that the inner corrugated hose could be formed of a thermoplastic material that readily permits the flexible hose construction to be utilized for conveying a volatile liquid therethrough, such as gasoline for transportation vehicles and the like, and still permit the hose construction to be sufficiently flexible and lightweight so that the same can be readily bent into the desired shape thereof for its intended conveying purpose.

For example, one embodiment of this invention provides a flexible hose construction comprising an inner corrugated hose made of polymeric material and having a plurality of outwardly convex projections with recesses therebetween and extending from one end thereof to the other end thereof, an outer sleeve of reinforcing material disposed in telescoping relation on the inner hose, and a tube of polymeric material disposed between the sleeve of reinforcing material and the inner hose and extending in a generally straight-line manner from projection to projection of the inner hose so as to tend to prevent the sleeve of reinforcing material from entering into the recesses of the inner hose an amount that would tend to substantially reduce the flexibility characteristics of the inner hose.

Accordingly, it is an object of this invention to provide a new flexible hose construction having one or more of the novel features of this invention as set forth above or hereinafter shown or described.

Another object of this invention is to provide a new method of making such a flexible hose construction, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

BRIEF DESCRIPTION OF THE DRAWINGS

FIG. 1 is a fragmentary perspective view, partially in cross section, and illustrating the new flexible hose construction of this invention.

FIG. 2 is an enlarged fragmentary side view, partially in cross section, and illustrating the inner corrugated hose of the hose construction of FIG. 1.

FIG. 3 is a view similar to FIG. 2 and illustrates the inner corrugated hose of FIG. 2 having a unique tube of polymeric material disposed thereon according to the method of this invention.

FIG. 4 is a view similar to FIG. 3 and illustrates how a sleeve of reinforcing material is disposed on top of the tube of polymeric material that has been placed on the inner corrugated hose as illustrated in FIG. 3.

FIG. 5 is a view similar to FIG. 4 and illustrates how an outer polymeric layer is disposed over the reinforcing sleeve of FIG. 4 to complete the hose construction of this invention that is illustrated in FIG. 1.

FIG. 6 is a fragmentary view similar to FIG. 2 and illustrates another embodiment of the inner corrugated hose.

FIG. 7 is a fragmentary perspective view similar to FIG. 1 and illustrates how a tube of polymeric material and a reinforcing sleeve can be disposed in series on the corrugated hose of FIG. 6.

FIG. 8 is a view similar to FIG. 7 and illustrates a completed hose construction of this invention made from the structure of FIG. 7 by having an outer polymeric layer disposed over the reinforcing layer of the structure of FIG. 7.

FIG. 9 is an enlarged fragmentary cross-sectional view of another inner hose of this invention for the hose constructions of this invention.

DESCRIPTION OF THE PREFERRED EMBODIMENTS

While the various features of this invention are hereinafter illustrated and described as being particularly adapted to provide a flexible hose construction for conveying gasoline and like volatile liquids therethrough, it is to be understood that the various features of this invention can be utilized singly or in various combinations thereof to provide a flexible hose construction for conveying any other fluid therethrough for other types of apparatus as desired.

Therefore this invention is not to be limited to only the embodiments illustrated in the drawings, because the drawings are merely utilized to illustrate one of the wide variety of uses of this invention.

Referring now to FIG. 1, the new flexible hose construction of this invention is generally indicated by the reference numeral 20 and comprises an inner corrugated hose 21 formed of any suitable polymeric material and having a plurality of outwardly convex projections 22 with recesses 23 therebetween and extending from one end 24 to the other end 25 thereof, a tube 26 of any suitable polymeric material extending in a generally straight-line manner from projection 22 to projection 22 as illustrated in FIG. 3, an outer sleeve 27 of any suitable reinforcing material disposed in telescopic relation on the tube 26, and an outer layer 28 of any suitable polymeric material that will provide a protection for the sleeve 27 of reinforcing material and also to tend to prevent any liquid that is conveyed through the flexible hose construction 20 from permeating to the exterior thereof, such as gasoline and the like.

As previously stated, it was found according to the teachings of this invention that the hose construction 20 can be relatively flexible because of the corrugated inner hose 21 thereof.

However, it was further found according to the teachings of this invention that the flexibility characteristics of such a hose construction 20 is diminished if a sufficient amount of the reinforcing means 27 is received in the recesses 23 of the inner hose 21 to resist the bending thereof.

Therefore, it was further found according to the teachings of this invention that by providing the tube 26 of polymeric material on the inner hose 21 before disposing the reinforcing sleeve 27 thereon with the tube 26 being so constructed and arranged that the same extends substantially from the apex 29 of one projection 22 to the next apex 29 of the next adjacent projection 22 in a substantially straight-line manner illustrated in FIG. 3, the tube 26 will substantially resist the penetration of the reinforcing layer 27 into the recesses 23 of the inner hose 21 to any great degree even though the reinforcing layer 27 is being forced radially inwardly either through the normal effect of applying the same onto the inner hose 21 and/or by the force of the outer cover 28 being applied over the reinforcing means 27 in a conventional hose forming manner, such slight penetration of the reinforcing means 27 being illustrated in FIGS. 4 and 5, whereby it can be seen that the recesses 23 remain substantially void of the reinforcing means 27 so as to retain the desired flexibility characteristics of the inner hose 21.

While the inner hose 21 of the hose construction 20 of this invention can be formed of any suitable material and in any suitable manner, one working embodiment thereof comprises thermoplastic material that is blow molded in a conventional manner into the configuration illustrated in FIG. 2 wherein the convolutions or projections 22 thereof are annular and are uniformly spaced from each other throughout the length of the hose 21 or can be disposed in a helical manner throughout the length of the hose as represented by the projections 22A illustrated in FIG. 6 wherein another inner hose of this invention is indicated by the reference numeral 21A and parts thereof similar to the inner hose 21 previously described are indicated by like reference numerals followed by the reference letter "A". The inner hose 21A is made in a conventional manner by spirally wrapping a strip 30 that has the projections 22A and recesses 23A formed therein in any suitable manner and forming a helically disposed seam 31 throughout the length of the inner hose 21A.

One problem with thermoplastic hoses currently being made is the stiffness thereof when compared to elastomeric rubber hoses of the same inner and outer dimensions. The stiffness of the prior known thermoplastic hoses is due to the rigidity of the plastic material. However, by using a convoluted or corrugated inner tube, the flexibility of the thermoplastic hose can be made greater than a rubber hose of the same size. The convolutions can be annular in nature and their geometry can be dependent upon the size of the hose to be produced.

A thermoplastic hose with a corrugated inner tube also has other advantages over conventional rubber hoses.

In particular, a plastic hose construction built with a convoluted inner corrugated hose has better kink resistance and a smaller bend radius than a rubber hose of the same size.

These properties are a result of the annular rings that form the convoluted tube. These annular rings provide hoop strength that results in superior kink resistance and smaller bend radius compared to smooth inner tube hoses.

Also, a corrugated inner hose of plastic material is lighter in weight per foot than a rubber hose. To reduce kinking and bend radius, conventional rubber hoses rely on thick hose walls and/or a helix wire. In contrast, the corrugated plastic hose 21 of this invention provides an excellent kink resistance so that a lightweight, thin wall hose construction 20 can be built without compromising kink resistance or bend radius.

The long-term resistance of plastic materials to degradation and wear is greater than that of rubber materials. For example, a large number of plastic materials are available with much better resistance to hydrocarbon-based liquids, such as gasoline, than standard rubber compounds. Certain thermoplastics offer greater ozone, abrasion and UV resistance than rubber compounds. Thermoplastics are also more easily colored and are more colorfast.

Therefore, the thermoplastic material of the inner hose 21 of this invention is chosen based on the chemical and thermal resistance requirements of the application of the hose construction 20 and based on a means to bond the corrugated inner hose 21 to the subsequently disposed layers thereon.

Thus, the inner hose 21 can comprise a single layer of a homogeneous thermoplastic material as illustrated in FIGS. 2-6 or the same can comprise an inner layer 21' of one type of thermoplastic material and an outer layer 21" of another type of thermoplastic material as provided for the inner hose 21B illustrated in FIG. 9 as it is well known that two plastic materials can be extruded together to form a tubular member having one material forming the outer surface thereof and the other material forming the inner surface thereof and thereafter such tubular member can be blow molded to form the same into a corrugated tubular member.

In any event, the tube 26 of polymeric material can be applied over the inner hose 21 either as a continuous tube by conventional extruding apparatus whereby the exuding tube 26 bonds by the nature thereof to the apexes 29 of the projections 22 in the substantially straight-line manner illustrated in FIG. 3 or the tube 26 could be disposed in a spiral manner as illustrated in FIG. 7 and comprise a strip 32 of polymeric material that is helically wound onto the inner tube 21A as illustrated in FIG. 7. However, it is to be understood that the inner tube 21A illustrated in FIG. 7 could be the inner tube 21 of FIG. 2 or the inner tube 21B of FIG. 9 rather than a tube wherein the projections are disposed in a helical manner, as desired.

In any event, it can be seen that the tube 26 provides a smooth surface over the convolutions 22 and provides a consistent base for receiving the reinforcement 27 thereon. The material of the tube 26 can be chosen so that it will adhere to the outer surface of the apexes 29 of the inner tube 21 so that the layer 26 does not fill the recesses 23 of the inner tube 21 and is applied in a manner to just cover the convolutions 22 in substantially the straight-line manner illustrated in FIG. 3 because, as previously stated, if the layer 26 were to fill the recesses 23, not only would the tube 26 then reduce the flexibility of the inner hose 21, but also the same would then allow the reinforcement 27 to enter those recesses 23 to further reduce the flexibility of the inner hose 21.

After the outer tube 26 has been applied in place in the manner previously set forth, the reinforcement sleeve 27 of either a braided textile material or a metal wire material that is wound in alternating directions is disposed over the tube 26 and the amount of reinforcement provided is dependent upon the working pressure requirements of the hose construction 20.

For example, the reinforcement sleeve 27 is illustrated as a braided material in FIG. 4 and thereby comprising a seamless sleeve of such material whereas the reinforcement 27A of FIG. 7 is illustrated as two layers of helically wound wire material disposed in opposite directions on the tube 26A.

In any event, it can readily be seen in FIG. 4 that the reinforcement sleeve 27 does not enter the recesses 23 of the inner hose 21 to any substantial amount because the tube 26 prevents the same from being forced into the recesses 23 as the reinforcement sleeve 27 is being applied to the desired thickness on the inner tube 21.

Thereafter, the outer layer 28 of any suitable polymeric material is applied over the reinforcement 27 such as by being extruded as a continuous tube thereof by conventional extruding apparatus to complete the hose construction 20 or by being applied in a helically wound form thereof from a strip 33 of such outer material in the manner illustrated in FIG. 8 to complete the hose construction 20A.

In any event, the outer layer 28 provides protection for the reinforcement 27 and can readily bond to the inner tube 26 by exuding through the reinforcement 27 in a manner well known in the art and as illustrated in FIG. 5 so as to hold all of the layers of the hose construction 20 in a bonded condition thereof, if desired.

The material of the outer layer 28 not only protects the reinforcement 27 from physical or chemical damage, but also the cover layer 28 is chosen with consideration to the environment and bondability to the other layers of the hose construction 20. In addition, the material 28 can be chosen so as to tend to prevent the liquid flowing through the hose construction 20 from permeating through the hose construction 20 to the exterior thereof.

As previously stated, the materials of the hose construction 20 of this invention can be any suitable materials that function in the manner previously set forth.

Therefore, the following example of one working embodiment of the hose construction 20 of this invention is not to be a limitation on this invention and is merely being given as one working example thereof.

In the one working embodiment of this invention, the inner hose is formed in the manner of FIG. 9 with the inner layer 21' comprising a thermoplastic material sold by DuPont as Zytel ST811HS and with the outer layer 21" thereof comprising a thermoplastic material sold by the B. F. Goodrich Company as ESTANE 5710F1. Such material is blow molded to form the hose 21B with an inside diameter of approximately 1.500 of an inch and with the distance between the apexes 29B of the projections 22B being approximately 0.246 of an inch. The thickness of the inner portions 34 of the hose 21B is approximately 0.045 of an inch while the sidewalls 35 between the portion 34 and the apexes 29B are actually disposed at an angle relative to each other rather than being parallel to each other as illustrated in FIGS. 2 and 3, such angle of each sidewall 35 being approximately 10° to a true transverse line passing through the inner hose 21B.

The tube 26 in such working embodiment of the hose construction 20 of this invention also comprises the thermoplastic material ESTANE 5710F1 and is approximately 0.040 of an inch thick while the reinforcement 27 comprises a polyester yarn formed on a thirty-six carrier braiding machine with two ends per carrier and the outer layer 28 comprises the thermoplastic material ESTANE 5710F1 and is approximately 0.060 of an inch thick.

In this manner, the thermoplastic material of the cover 28 readily bonds to the tube 26 and the thermoplastic material of the tube 26 readily bonds to the outer layer 21" of the inner tube 21B.

Therefore, it can be seen that the resulting hose construction 20 or 20A of this invention is readily adapted to be utilized for conveying any desired fluid therethrough, such as a volatile liquid, and will permit the hose construction 20 or 20A to be disposed in a bent configuration for such purpose as desired.

Thus, this invention provides a new flexible hose construction and a new method of making such a flexible hose construction.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a method of making a flexible hose construction comprising the steps of forming an inner corrugated hose of polymeric material to have a plurality of outwardly convex projections with recesses therebetween, disposing an outer sleeve of reinforcing material in telescoping relation on said inner hose, and disposing an outer sleeve of polymeric material in telescoping relation on said sleeve of reinforcing material, the improvement comprising the steps of disposing a tube of polymeric material between said sleeve of reinforcing material and said inner hose by extruding said tube onto said inner hose before disposing said sleeve of reinforcing material thereon, the step of extruding causing said tube to have substantially constant inner and outer diameters whereby said tube extends in a generally straight-line manner from projection to projection of said inner hose so as to prevent said sleeve of reinforcing material from thereafter entering into said recesses of said inner hose an amount that would tend to substantially reduce the flexibility characteristics of said inner hose, forming said inner hose with an outer layer of one thermoplastic material and an inner layer of a different thermoplastic material, forming said tube of polymeric material from the same thermoplastic material that forms said outer layer of said inner hose, forming said outer sleeve of polymeric material of the same thermoplastic material that forms said tube of polymeric material, the step of extruding causing said tube of polymeric material to be bonded to said projections of said inner hose, and bonding said sleeve of polymeric material to said tube of polymeric material through said sleeve of reinforcing material by extruding said sleeve of polymeric material onto said sleeve of reinforcing material whereby said tube of polymeric material holds said sleeves and said hose together.

2. A method of making a flexible hose construction as set forth in claim 1 and including the step of forming said projections to be annular and be disposed substantially transverse to the longitudinal axis of said hose construction.

3. A method of making a flexible hose construction as set forth in claim 1 and including the step of forming said projections of said inner hose to extend in a helical path about the longitudinal axis of said hose construction.

* * * * *